US012725526B2

(12) United States Patent
Chand et al.

(10) Patent No.: US 12,725,526 B2
(45) Date of Patent: Sep. 1, 2026

(54) ADAPTIVE FLEET VEHICLE DISPATCH WITH EDGE SENSING

(71) Applicant: FORD GLOBAL TECHNOLOGIES, LLC, Dearborn, MI (US)

(72) Inventors: Arpita Chand, Dearborn, MI (US); Oliver Lei, Windsor (CA); Somak Datta Gupta, Novi, MI (US); Jayanthi Rao, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1214 days.

(21) Appl. No.: 17/513,290

(22) Filed: Oct. 28, 2021

(65) Prior Publication Data

US 2023/0140349 A1 May 4, 2023

(51) Int. Cl.

| | |
|---|---|
| ***G08G 1/00*** | (2006.01) |
| ***G06F 18/24*** | (2023.01) |
| ***G06V 20/52*** | (2022.01) |
| ***G06V 40/10*** | (2022.01) |

(52) U.S. Cl.

CPC ............. *G08G 1/202* (2013.01); *G06F 18/24* (2023.01); *G06V 20/52* (2022.01); *G06V 40/10* (2022.01)

(58) Field of Classification Search

CPC .. G06Q 50/40; G06Q 10/02; G06Q 10/06311; G06V 20/56; G06V 20/54; G06V 20/58; G06V 20/52; G06V 40/10; H04W 4/029; G08G 1/202; G06F 18/24

See application file for complete search history.

(56) References Cited

U.S. PATENT DOCUMENTS

| | | | | |
|---|---|---|---|---|
| 5,298,697 | A | 3/1994 | Suzuki et al. | |
| 7,840,427 | B2 | 11/2010 | O'Sullivan | |
| 9,240,051 | B2 | 1/2016 | Liu et al. | |
| 9,910,438 | B1 * | 3/2018 | Arden | G01C 21/26 |
| 10,008,121 | B2 * | 6/2018 | Tulabandhula | G08G 1/123 |
| 10,133,937 | B2 | 11/2018 | Hotta et al. | |

(Continued)

FOREIGN PATENT DOCUMENTS

GB 2294114 A 4/1996

OTHER PUBLICATIONS

Automatic Passenger Counting; www.retailsensing.com; Sep. 15, 2020; 7 pages.

*Primary Examiner* — Aryan E Weisenfeld

(74) *Attorney, Agent, or Firm* — Joseph Zane; Brooks Kushman P.C.

(57) ABSTRACT

A system includes a multi-access edge computing camera that can determine characteristics of a group of waiting vehicle passengers based on machine-classification and count of individual elements of the group derived from imaging the group with the camera and supplement at least the count based on short-range wireless broadcast received from mobile devices possessed by members of the group. The camera conveys the characteristics to a dispatch process, and the dispatch process determines that a non-dispatched fleet vehicle has present capacity to accommodate the determined characteristics. The dispatch process determine that the characteristics meet a defined predicate for dispatch of the non-dispatched fleet vehicle and responsive to determining that the characteristics meet a defined predicate for dispatch of the non-dispatched fleet vehicle, dispatches the fleet vehicle.

20 Claims, 4 Drawing Sheets

(56) References Cited

U.S. PATENT DOCUMENTS 10,248,913 B1* 4/2019 Gururajan .............. G06Q 10/02
10,881,357 B1* 1/2021 Watson .................. G16H 40/67
11,541,843 B1* 1/2023 Stoffel ............... G07C 9/00857
11,763,408 B2* 9/2023 Stumpf ............... G06F 16/9537 705/7.34
2011/0092249 A1* 4/2011 Evanitsky ......... H04M 1/72481 455/556.1
2015/0294430 A1* 10/2015 Huang ..................... G08G 1/22 701/2
2017/0169366 A1* 6/2017 Klein ................... G06Q 10/025
2017/0213403 A1* 7/2017 Diehl ....................... G07C 9/27
2017/0277191 A1* 9/2017 Fairfield ................ G08G 1/005
2018/0046961 A1* 2/2018 Tulabandhula .......... G06N 7/01
2018/0072172 A1* 3/2018 Takehara .................. H02J 7/00
2018/0075754 A1* 3/2018 Salter .................... H04W 4/023
2018/0165672 A1* 6/2018 Handley ................ G07B 15/02
2018/0211541 A1* 7/2018 Rakah ................ G06Q 10/0631
2019/0025820 A1* 1/2019 Ferguson ............. G08G 1/0112
2019/0026671 A1* 1/2019 Al Falasi ........... G01C 21/3438
2019/0206009 A1* 7/2019 Gibson .................. G06Q 50/40
2019/0265703 A1* 8/2019 Hicok .................... G05D 1/617
2019/0325748 A1* 10/2019 Tudi ................... G01C 21/3697
2020/0023811 A1* 1/2020 Herman .................. B60R 25/01
2020/0065931 A1* 2/2020 Engle .................... H04W 4/029
2020/0117215 A1* 4/2020 Shiga ................... G05D 1/0212
2020/0158525 A1* 5/2020 Rakah ................ G01C 21/3461
2020/0239032 A1* 7/2020 Kamata ................ G05D 1/0276
2020/0323713 A1* 10/2020 Girardin ............... B60P 7/0807
2020/0327317 A1* 10/2020 Park ....................... G05D 1/021
2021/0035450 A1* 2/2021 Gao ................. G08G 1/096844
2022/0024717 A1* 1/2022 Sukegawa ............. B66B 1/2408
2022/0068139 A1* 3/2022 Brandon ......... B60W 60/00253
2022/0301430 A1* 9/2022 Sudo ...................... H04N 7/183
2022/0340176 A1* 10/2022 Haubert ............... G06V 40/103
2022/0351104 A1* 11/2022 Lodhia ............... G06Q 10/0631
2022/0378302 A1* 12/2022 Marcolino Quintao Severgnini ........... A61B 5/0006
2023/0094147 A1* 3/2023 Alfred ..................... H04L 67/53 348/14.08
2023/0095218 A1* 3/2023 Livne ................... G06N 3/0464 382/118
2023/0196916 A1* 6/2023 Nakamura ...... B60W 60/00253 340/994
2024/0054888 A1* 2/2024 Ogata .................. G08G 1/0141
2024/0169460 A1* 5/2024 Kobayashi ............. G06Q 10/02

* cited by examiner

ADAPTIVE FLEET VEHICLE DISPATCH WITH EDGE SENSING

TECHNICAL FIELD

The illustrative embodiments generally relate to methods and apparatuses for adaptive fleet vehicle dispatch with edge sensing.

BACKGROUND

There are many instances where a fleet of transportation vehicles will be continually or temporarily provided. Airports and other facilities having large numbers of parking spaces may utilize shuttle services to move customers or personnel to and from certain locations. Conferences may require shuttling to and from lodging to conference locations.

The typical model for these instances is to have shuttles on a loop, where a driver will drive a circular path and either take the current passenger load or wait, if a current passenger load is below a preferred level, given vehicle capacity. This can be highly inefficient, resulting in resource (e.g., fuel) overuse, and may also require larger-than-necessary vehicles to comprise the bulk or all of the fleet, in order to avoid leaving people behind when it is busy. Further, certain passengers may have special requirements, such as wheelchair access, service animals or large luggage, and unless every vehicle is equipped to handle these requirements, those people may have to wait for a special vehicle. On the other hand, equipping every vehicle in a fleet to handle all possible special requirements can be quite costly and inefficient.

One attempt to accommodate this has been to have passengers book passage in advance, but this requires the passenger to arrive on time, and leaves little accommodation for unexpected delays. If the passenger identified a special requirement, for example, but then missed the shuttle that could accommodate them, they could wait a significant amount of time for another shuttle that could accommodate them, if all shuttles were not so-equipped. Meanwhile, the missed shuttle may be carrying passengers, but may be inadvisably used, as it may be the only shuttle in a fleet that is equipped to handle a certain requirement, and since that passenger missed the shuttle, that aspect of the resource is not being used and is not available to service other passengers until the current passenger load has disembarked.

SUMMARY

In a first illustrative embodiment, a system includes a multi-access edge computing camera, including a processor configured to determine characteristics of a group of waiting vehicle passengers based on machine-classification and count of individual elements of the group derived from imaging the group with the camera and supplement at least the count based on short-range wireless broadcast received from mobile devices possessed by members of the group. The camera is also configured to convey the characteristics to a dispatch processor, the dispatch processor configured to determine that a non-dispatched fleet vehicle has present capacity to accommodate the determined characteristics. The dispatch processor is further configured to determine that the characteristics meet a defined predicate for dispatch of the non-dispatched fleet vehicle and responsive to determining that the characteristics meet a defined predicate for dispatch of the non-dispatched fleet vehicle, dispatch the fleet vehicle.

In a second illustrative embodiment, a method includes determining a count of vehicle passengers in a defined loading zone using a multi-access edge computing camera, based at least in part on both counting detected short-range wireless transmissions from passenger devices and machine analysis of imaging of the loading zone capture by the camera. The method also includes determining an available fleet vehicle having present capacity to service the count of vehicle passengers and dispatching the fleet vehicle to the loading zone responsive to determining that the available vehicle has present capacity.

In a third illustrative embodiment, a non-transitory computer readable storage medium storing instructions that, when executed, cause one or more system processors to perform a method including determining a count of vehicle passengers in a defined loading zone using a multi-access edge computing camera, based at least in part on both counting detected short-range wireless transmissions from passenger devices and machine analysis of imaging of the loading zone capture by the camera. The method also includes determining an available fleet vehicle having present capacity to service the count of vehicle passengers and dispatching the fleet vehicle to the loading zone responsive to determining that the available vehicle has present capacity.

DETAILED DESCRIPTION

Figure 1:
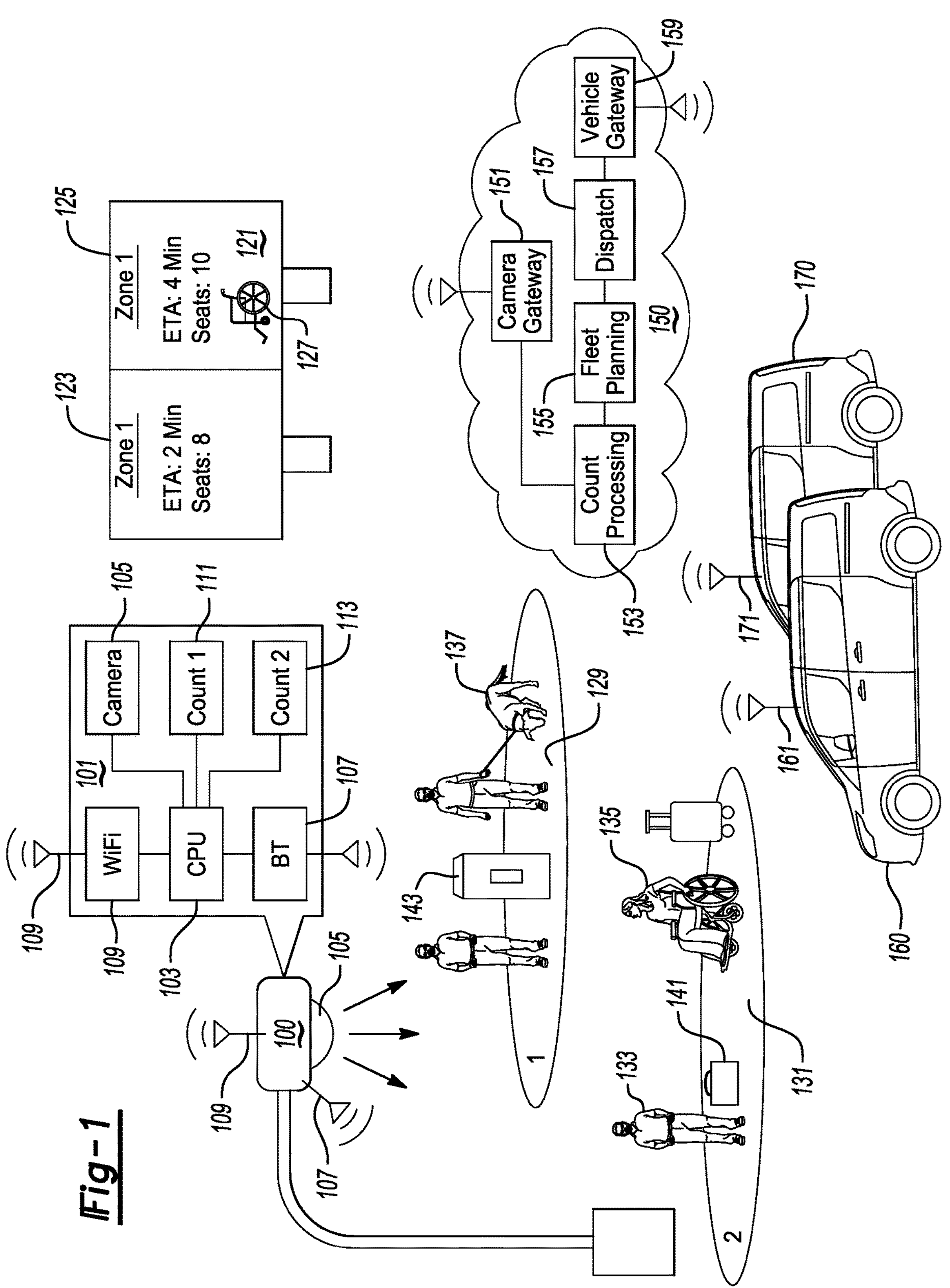
FIG. 1 shows an illustrative example of a fleet and passenger dispatch and pickup system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The illustrative examples, and the like, provide an opportunity to better manage a fleet of vehicles by smart dispatching enabled by edge sensing and processing. Multi-access edge computing (MEC) cameras and similar sensors can be deployed at strategic locations, permanently (for things like airports) and even temporarily (for short-term shuttling needs, like a conference that rents a parking structure). The cameras/sensors may include all the necessary software and hardware to count or estimate passengers in designated loading areas, as well as identify special requirements of passengers that may require one vehicle over another.

This provides an opportunity to automatically select and dispatch appropriate vehicles, in terms of both size and capabilities. That can result in significant resource savings, as smaller vehicles can be used when needed, as well as significant overhead savings, as the fleet can be right-sized and does not require buying the largest and most capable vehicles to represent every vehicle in the fleet. Further, when no passengers are present, vehicles are not endlessly driving a loop waiting for someone to arrive, saving both resources and wear-and-tear on the vehicles.

In an all autonomous solution, or even when a driver is present, additional MEC cameras can provide overhead vision of tricky maneuver points and around blind corners, either improving autonomous driving solutions (e.g., drive by wire) and/or providing a human with information that can increase the safety of the overall system. These cameras may identify other vehicles, animals and pedestrians, using onboard logic and may communicate this information directly to a vehicle, effectively having the cameras serve as advanced and additional sensing for the vehicle.

FIG. 1 shows an illustrative example of a fleet and passenger dispatch and pickup system. In this example, a number of MEC edge cameras 100 are deployed throughout a parking lot area and/or along a route, providing overhead views of both passenger pickup zones 129, 131 and driving lanes. In addition to assisting in counting passengers and dispatching vehicles 160, 170, these cameras 100 can provide guidance to vehicles by advising vehicles of object locations, allowing autonomous or semi-autonomous travel to proceed more easily.

The camera is provided with onboard computing system 101, which can include one or more processors 103 and Wi-Fi 109 and BLUETOOTH 107 transceivers. The camera may also wired or wirelessly report to a central processor (e.g., backend server(s) and processes 150), which in this example can include a dispatch system.

The camera element 105 can provide overhead views of passenger pickup zones 129, 131, and may be positioned to be able to distinguish one passenger from another within a zone. That is, the line of sight may be such that passengers do not block each other from the camera's field of view. The computing system 101 may also include one or more counting processes 111, 113 and other edge processing, allowing on-site computing to occur, which can reduce the burden on a network and reduce the amount of backend processing as well as data that needs to be transferred. If bandwidth is limited and the edge processing is trusted, the camera 100 may simply report counts and data statistics (e.g., large luggage, service animals, people with special assistance needs, etc.) and not send a video feed. Edge processing can also help the camera in guiding vehicles 160, 170, if the camera includes object detection and/or collision avoidance processing that can help instruct the vehicle where to travel and when to stop.

In this example, a sign 121 on-site may display passenger counts for zones 123, which can give waiting passengers an estimated time of arrival 125 as well as a seat-count of a dispatched vehicle 160, 170. This can encourage people to shuffle or board an approaching vehicle 160 if it has extra capacity. If this will create too much movement or possible disputes about spare seat usage, such a sign need not be provided. The signage may also display any special capabilities of the approaching vehicle 160, 170, such as the availability of a wheelchair loading ramp 127.

Passengers 133 stand within zones 129, 131, although the camera 100 may also be able to count passengers outside of the zones as well. The zones provide a convenient demarcation for grouping passengers for a pickup, but overflow is possible. In addition to counting passengers 133, the camera

100 can be provided with image recognition software allowing it to recognize people needing special vehicles 135, service animals 137 (which may also require special vehicles), standard luggage 141 and large luggage 143. Since the camera can evaluate and obtain a reasonably complete sense of the scene, and continually update, the dispatch 150 can be provided with ongoing accurate information about passenger counts and any special assistance that may be needed from dispatched vehicles 160, 170.

A camera gateway process 151 on the backend communicates with the MEC cameras 100 and continually receives information about all of the loading zones under observation. This provides the dispatch 150 with an accurate and up-to-date data set about waiting passengers, and helps avoid over or under dispatching vehicles. As discussed later herein, vehicles can be dispatched, for example, on the basis of immediate needs (passenger centric) or immediate availability (vehicle centric), or in a combination of these and other considerations. This can allow much greater efficiency of fleet usage, as well as preserving power and preserving special capability and/or large capacity vehicles for when they are needed, preventing certain passengers 135 or large groups of people from having to wait too long because a vehicle that would have otherwise serviced them was dispatched to a zone where its full capacity was not needed.

Count processing 153 handles the incoming information and keeps a dispatcher, if present, advised of the situation. A dispatcher may not fill a particular role, since the system may function in the absence of a human presence, but the dispatcher may serve in an emergency capacity, where there is a failure on a part of the system and/or an unexpected circumstance occurs.

The system can be fully accommodative of changing conditions as well, as the MEC cameras 100 may be provided with advanced environmental sensing. For example, parameters for dispatch may be diminished when the weather is adverse, to prevent people from standing in the rain, snow or extreme cold. Similarly, re-dispatch may be possible, based on preferred service parameters, so that a late-arriving passenger can be accommodated by the vehicle 160, 170 returning to the scene if the vehicle 160, 170 is not too far away by the time the passenger arrives. The vehicle could also be instructed to wait if the camera sees a passenger running towards the vehicle 160, 170.

The cameras and dispatch 150 may also work in conjunction with an application on a passenger device, to instruct passengers which vehicle 160, 170 to board and could even provide a temporary boarding pass if appropriate, to avoid disputes about boarding. This cooperation could also provide a passenger with live pickup data about which vehicles 160, 170 were arriving where, allowing passengers to plan parking better or move to another location if a planned vehicle pickup was missed. Further, such data can supplement the dispatch, if the system knows where passengers are located before parking and which zones they appear to be headed to. For example, if a large number of vehicles were approaching a zone with only one person, there may be immediate dispatch based on an expected threshold number of passengers as indicated by feedback from the mobile devices. At the same time, those devices could tell the still-parking passengers that a vehicle 160, 170 had been dispatched, encouraging them to park as soon as possible and use that vehicle, thus aiding in the accuracy of the predicted need. It is worth noting, however, that the systems and methods herein still function even in the absence of such specific software, and the like, being present on a passenger mobile device.

A fleet planning process 155 may continually monitor the location of vehicles 160, 170, the capabilities and capacities of vehicles 160, 170, the arrival times, unloading and loading times, and passenger waiting and arriving (if available) data. This allows for highly efficient fleet usage, as all of this information can be used to strategically utilize vehicles, providing lesser wait times, correct vehicle placement for special assistance, lower power/fuel usage and a general need for fewer vehicles in the fleet to begin with. This also helps avoid the traditional model where vehicles simply circle around periodically, picking up whatever passengers happen to be present, and/or forcing passengers to wait because a too-large vehicle 170 was dispatched and the driver wants to wait to see if the driver can better fill the vehicle.

A dispatch process 157 can communicate with the vehicles 160, 170 through a vehicle gateway 159, which allows the backend to instruct the vehicles 160, 170 where to go, and receive updated route and location information from the vehicles 160, 170 while they are traveling. This can include loading counts, which will allow the backend to determine an approximate unloading time. Knowing vehicle routes, travel times and loading/unloading times can allow for more efficient planning of a next-use of the vehicle as well. If the system has, for example, need to pickup twelve passengers and currently only has two eight passenger vehicles available, but a twelve passenger vehicle will be available in one minute and thus only be one minute behind the eight passenger vehicles in travel, the system may elect to wait for the larger vehicle, instead of inefficiently dispatching the two smaller vehicles with the excess capacity. This also leaves the two smaller vehicles free to service two additional zones, which can further increase the overall efficiency of the system.

All of the camera-side and backend processes are merely illustrative of the types of processing that can occur at a given location, and are not meant to be limiting in any fashion. They may be combinable, replaceable, relocatable (e.g., to the other side of the system) and or modifiable in any reasonable manner and do not define a required system, but rather define possible capabilities of a given entity.

Figure 2A:
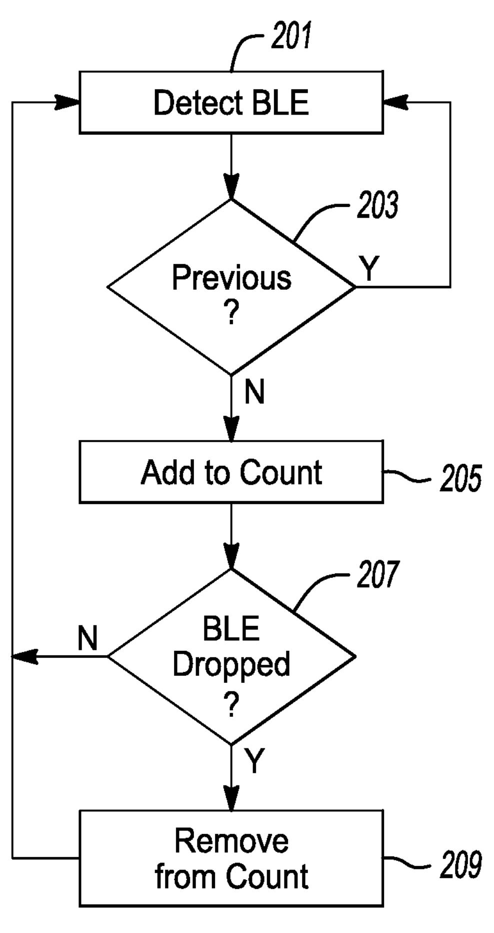
FIG. 2A shows an illustrative process for counting passengers.

FIG. 2A shows an illustrative process for counting passengers. In this example, the count is enabled by the use of short-range wireless transmission, such as BLUETOOTH low energy (BLE). A person who desires shuttle usage is asked to download an application to their phone, which enables BLUETOOTH communication. When the passenger stands in proximity to an MEC BLE module included in the camera, the module detects a BLE broadcast from the phone at 201. If BLE broadcast is from a previously identified device that is already part of the count at 203, the process continues to look for more new devices. Otherwise, the process will add a device count to a counter at 205.

If the person moves away (e.g., boards another shuttle or leaves), the broadcast is no longer detected at 207 and the device is removed from the count at 209. This illustrative example is good at counting devices, and data may be shared between proximate cameras if the zones are grouped too closely and a single device is detected by multiple MEC cameras, so that the device is only counted once by one MEC camera.

While the device count may be fairly accurate, some passengers will not have BLUETOOTH enabled, and other passengers (e.g., children, dogs, etc.) may not even have devices. This could be partially accommodated by having a passenger designate how many travelers they are with, when using the application, so that the device was registered as representing multiple people, but if two parents both identified four passengers and both installed the application, then the two devices might be counted as eight people instead of four. So, while this is a possible workaround and can be implemented, controls should be enacted to limit the impact of such events. On the other hand, a feature such as this could allow passengers to identify special requirements as well (e.g., wheelchair, large luggage, service animal, etc.) and this could be conveyed as well when the BLE signal is detected. Again, duplication of information may be avoided by using certain controls—one of which could include determining if the same data points showed up twice in near proximity (for example, two BLE signals, each indicating four passengers, one service animal and two large pieces of luggage, probably represents duplicate information. Alternatively, if the two applications (e.g., one on each parent device) are traveling in proximity to each other for some period of time, they can cooperatively exchange information and arrange to only have the data recorded for a single one of the two signals—e.g., the signal from device 1 can instruct the MEC camera to ignore the signal from device 2, since device 1 and device 2 have cooperated to confirm that they are often in close proximity and that they have overlapping data that likely applies to a single family unit. These are merely examples of how controls can be implemented if passenger data input is desired, which can improve the capability associated with the device sensing, but may need some constraints to avoid false counts.

If an operator wants to enforce application inclusion in a more robust manner, they could generate an access pass usable to enter a vehicle 160, which may be free, but may require the application to be installed. Identifying a plurality of people could provide additional access passes on a single device, and the passes could entitle possessors to board first. Once all occupants with passes had boarded, the vehicle 160 could allow an additional number of passengers equal to the remaining seats, and in this manner people could be incentivized to use the application to ensure priority boarding. This can also help accommodate a situation where there are too many people, as the passes could be generated first come first served.

Figure 2B:
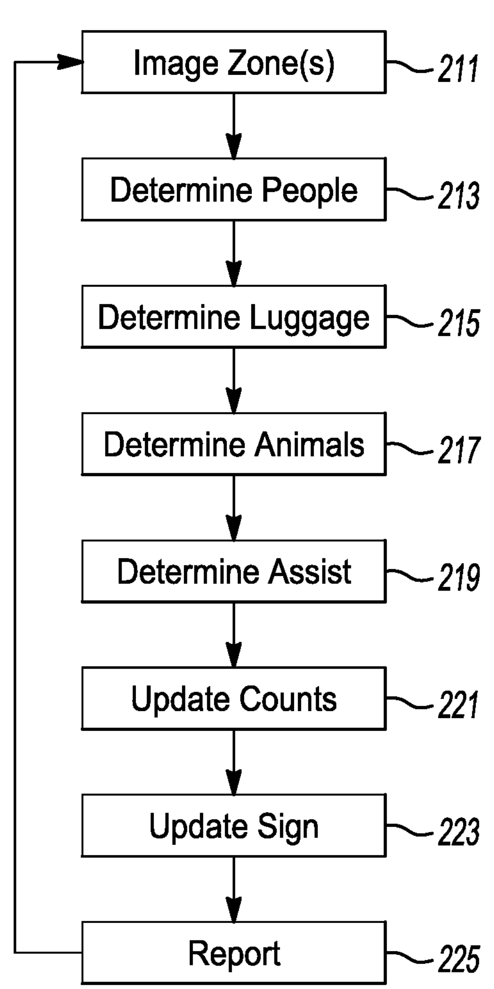
FIG. 2B shows a second illustrative process for counting passengers.

As an additional option to provide more robust data, counting can also be performed using the MEC camera. FIG. 2B shows a second illustrative process for counting passengers that relies on data gathered from the camera. Even when basic BLE (signal counts) or advanced BLE (signal counts+ additional data) counting, or similar short-range signal detection counting, is utilized, there may still be many people who lack BLE devices, and/or the data may be incomplete in any event, because of a failure to identify special requirements or a system lacking anything more than basic BLE/short-range-signal sensing.

Accordingly, the MEC camera may also be able to recognize people and special requirements and supplement the count. Both data sets may be used to improve the other's accuracy, however either one alone may provide a rough estimate (situationally) and either or both may also be combined with other methods of obtaining headcounts and special requirements. For example, without limitation, a gated region could be installed, especially where the zones are permanent, and this could provide a reasonable person count. Special access gates for large luggage, passengers in wheelchairs and service animals could also provide a reasonable indication that such things were present in a passenger group. Of course, such gating could be expensive and is not always practical, and so at least one alternative solution using the MEC camera is described with respect to FIG. 2B.

In this example, the camera 100 includes a pretrained machine learning model that carries out detection and counting (e.g., without limitation, histograms of oriented gradients and support vector machine classifiers). This model can be tuned to identify people, special conditions (e.g., wheelchairs, service animals, walkers/canes, luggage, both large and smaller, etc.). The counts can be compared and combined in any reasonable manner, and together may produce a better representation than either acting alone. It is appreciated, however, that when circumstances dictate, either can be used as a stand alone solution as well.

The camera 105 images the zone at 211 and determines the presence of people 213, luggage 215 (including classification), animals 217 and special assistance events 219 (e.g., wheelchairs, walkers, etc.). Local counts are updated at 221, and may be combined with BLE counts to provide a more accurate count, if desired. The MEC camera 100 may also send live streaming via a cellular network (e.g., 5G), a wireless connection, or a wired connection. If the wireless connection is, for example, Wi-Fi, all cameras may not be in range of a dispatch, but the cameras may form a star or similar network and thereby establish a fully connected set of cameras, assuming each is deployed within communicable proximity of at least one other camera or the dispatch.

If there is a local information sign 121, the MEC camera(s) 100 can update the sign at 223 and/or report the data back to the dispatch at 225. The local cameras may or may not update a current count at a sign (which may depend on the accuracy of the data, so as not to confuse people) and/or the local sign may be updated by dispatch 140 with information pertaining to en-route shuttles, as opposed to displaying a current count, if desired.

Figure 3:
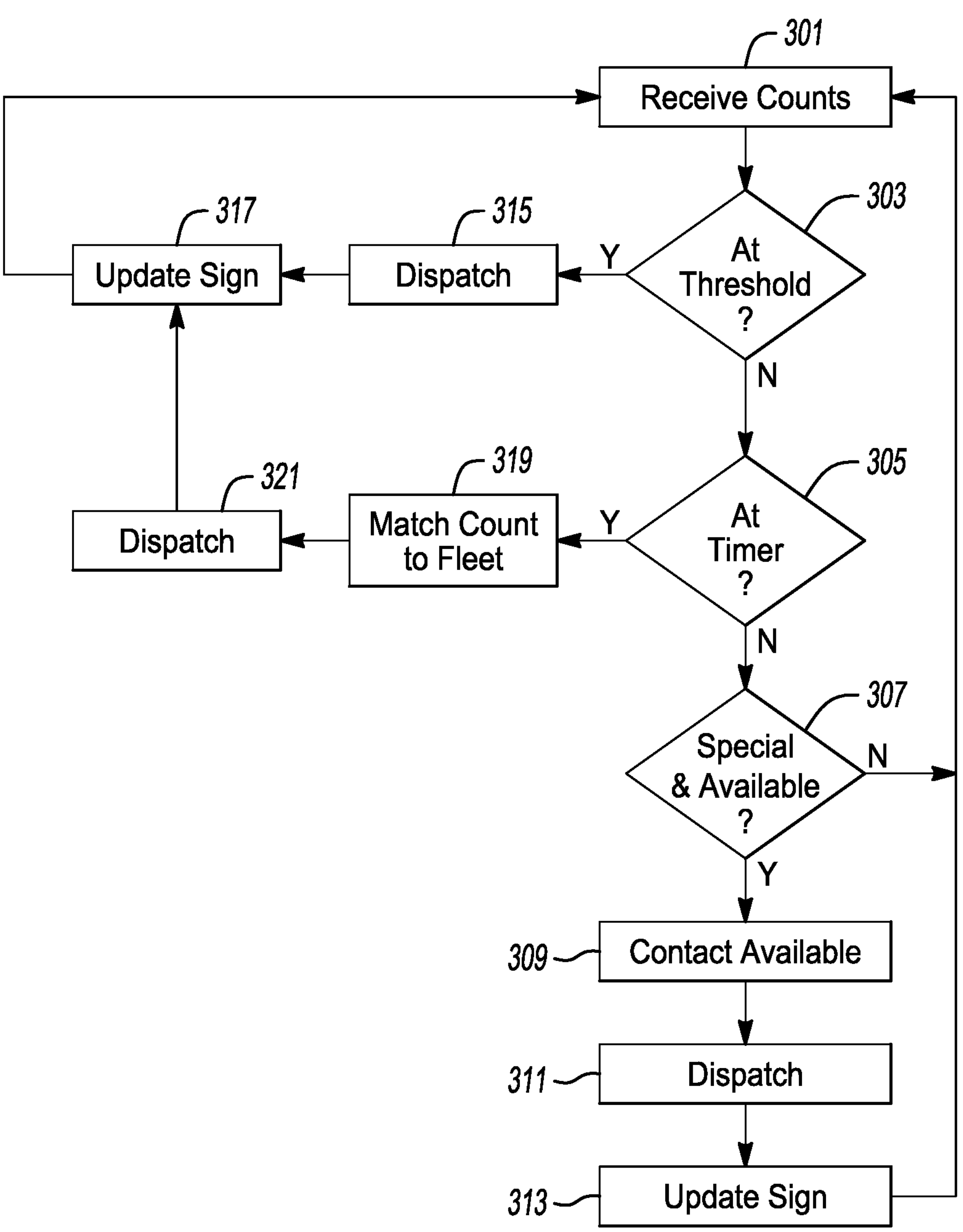
FIG. 3 shows an illustrative process for count-based dispatch.

FIG. 3 shows an illustrative process for count-based dispatch. In this example, the counts are at least one predicate for dispatch, and the process receives the passenger counts at each zone at 301. If the count reaches a threshold for dispatch (e.g., when there are at least ten people) at 303, the smallest appropriate vehicle that can handle at least ten people may be dispatched at 315. This model waits until crowds of certain sizes arise and then services those crowds. An onsite sign may be updated at 317, and the threshold for dispatch may below any vehicle's capacity, in order to accommodate late-arrivers with extra seating.

If there is no zone that has reached capacity, the process determines if a time threshold has passed at 305, and then matches the current count at the zone for which dispatched is due with a fleet vehicle at 319. Again, if a large enough vehicle is available (which should be the case in this instance, as no zone hit the capacity limit for immediate dispatch), the dispatch process will send a vehicle with extra seating in case people arrive while the vehicle is in transit. If no sufficiently sized vehicle exists (e.g., there are 10 people and only two six seat vehicles), multiple vehicles may be dispatched at 321. Again, an onsite sign 121 may be updated to indicate single or multiple vehicle dispatch and capacity.

If there is special assistance needed at 307 and such a vehicle is readily available, the process may contact that vehicle at 309 to confirm it is not presently being used. If it is not being used, the vehicle may be immediately dispatched at 311 and the sign may be updated to indicate the special assistance vehicle is enroute at 313. By using these vehicles when available (as discussed more with respect to FIG. 4 and the examples that follow), the fleet can include fewer of these vehicles, which may include expensive equipment, but still can adequately service special assistance needing passengers.

Figure 4:
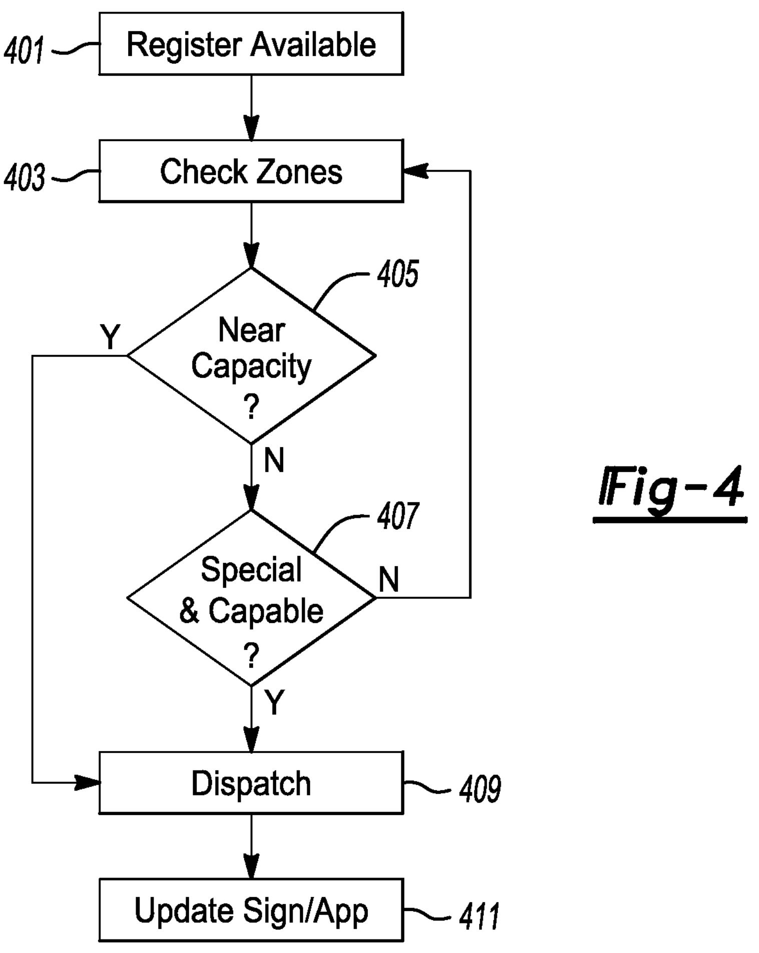
FIG. 4 shows an illustrative process for availability-based dispatch.

FIG. 4 shows an illustrative process for availability-based dispatch. This is a model that can work in conjunction with or alternatively to the other example in FIG. 3. This is an example where dispatch uses an active threshold based on a number of available seats in an available vehicle, as opposed to simply waiting until a threshold number of passengers are present. This may be more useful at times of high demand and when there is variance in sizes of fleet vehicles. The other system may be utilized during lower demand times and/or to avoid dispatching a number of smaller vehicles more repeatedly—e.g., if a fleet has four large vehicles and four smaller vehicles, relying solely on the system of FIG. 4, or a similar system, may result in overuse of the smaller vehicles. Situationally, which system, or a combination, or a variation of one or both, to be used may be a dynamic call of a fleet operator. Historic data may reveal times of day and days of week when one is a preferable implementation over another and/or when these both, and/or similar concepts, should be used in conjunction.

The process in FIG. 4 registers the vehicles 160 that are available at 401, which are any vehicles 160 that are not currently en-route or which can be re-routed to intermediary points, if those vehicles 160 still have available capacity, as well as their available capacity, which defines an active and dynamic threshold for dispatch (as opposed to a passive threshold based on on-site passenger count).

The process then checks the various zones at 403 for which counts are presently available to determine if any zone is nearing a dispatch-capacity at 405 equal to or close to the smallest available vehicle (or a vehicle of a certain size, if the smallest is reserved). In this example, the vehicles 160 may run on a regular schedule (e.g., every 5 minutes, at least one is dispatched) assuming that there is at least one passenger in a zone, but the vehicles 160 may also be instantly dispatched at 409 if a zone is full or near-full, in order to avoid zone overflow and a backlog of passengers. Or there may be no regularly scheduled runs, unless at least one passenger is present, which is a decision that can be made with the aid of the MEC cameras, preventing vehicles from running routes when no one is actually present.

When a vehicle is dispatched in this manner, the system may choose the vehicle 160 that has the closest capacity to the present count, with a certain number of additional seats (if possible) to accommodate additional arriving passengers. Historic and recently observed data can be gathered and weighted in a manner that helps predict how many passengers are likely to arrive in a 5-10 minute trip from dispatch until arrival at the zone, which can help even more accurately choose which vehicle 160 to dispatch. Choosing, for example, the smallest vehicle, will set the threshold at the next smallest vehicle+any accommodation (e.g., extra seats).

If the MEC camera 100 assigned to a zone has identified any special requirements at 407, this could also result in immediate dispatch if a vehicle 160 that can accommodate those requirements is available. Since the fleet may be right-sized with regards to inclusion of these vehicles 160, they may also need to be used whenever possible (as needed for accommodation), since there may be consecutive needs for these vehicles over a small interval of time. Even if the vehicle 160 would not be full of passengers in this instance, accommodating the needs on an as-occurs basis, especially if limited accommodating vehicles exist in a fleet, may help keep those resources as freely usable as possible. Similarly, in order to preserve those resources, those vehicles 160 may be reserved for usage in specific scenarios, unless another vehicle is not available and dispatch is appropriate. Dispatch of a vehicle 160 may result in update of an onsite signage 121 at 411.

For example, in a first scenario, there are two zones with eight people each, and two vehicles with twelve and sixteen person capacity. Data may indicate that up to two people may arrive at either zone during a journey (which is just a prediction, not a guarantee), and so the dispatch may consider ten people to be the threshold for immediate dispatch of the twelve person vehicle and fourteen people to be the threshold for immediate dispatch of the sixteen person vehicle.

Both vehicles are scheduled to run in five-minute intervals, but at minute two the first zone may add two passengers, resulting in immediate dispatch of the smaller vehicle to the first zone. The second vehicle will then be dispatched at either the five-minute mark or when the other zone reaches fourteen passengers.

If the second zone had a person in a wheelchair, and the larger vehicle was wheelchair enabled, then the sixteen-person vehicle may be dispatched immediately upon detection of the wheelchair. This will help the vehicle complete its route in case the wheelchair capability was needed again. If the smaller vehicle had this capacity, it might be immediately dispatched, which would then set the threshold for immediate dispatch to the second zone to fourteen people, since only a sixteen person vehicle would remain in that instance.

If the larger vehicle was dispatched to the second zone to accommodate the wheelchair and, after arrival, no additional passengers were included (e.g., it only had eight people onboard), it may be rerouted to the second zone if that zone still only had eight people. The smaller vehicle, which may be enroute to the second zone at that point because five minutes may have passed, may be paused in transit as it is not needed, and it may be a better use of resources to have the large vehicle filled and the smaller vehicle still available. On the other hand, if the first zone is further from the destination than the second zone, the second vehicle may continue as originally dispatched, as the delay from sending the wheelchair enabled vehicle in the wrong direction may be more inefficient than simply using the second vehicle to service the first zone.

As can be seen from the example, even a small fleet can be optimized in a manner that is much more efficient than simply dispatching a vehicle every N minutes, saving both time and resources, as well as allowing the fleet to have vehicles with less capability than other vehicles, which then are also presumably cheaper than their larger, more capable counterparts. Special assistance vehicles can also be provided, if the fleet owner observes that the sixteen person vehicle, with wheelchair assistance, is being dispatched too frequently and often has a less than full load, the owner can obtain a smaller vehicle for use to save on resources and keep the vehicle more near capacity, saving the use of the larger vehicle for when the volume of passengers plus the assistance needs dictate.

Figure 5:
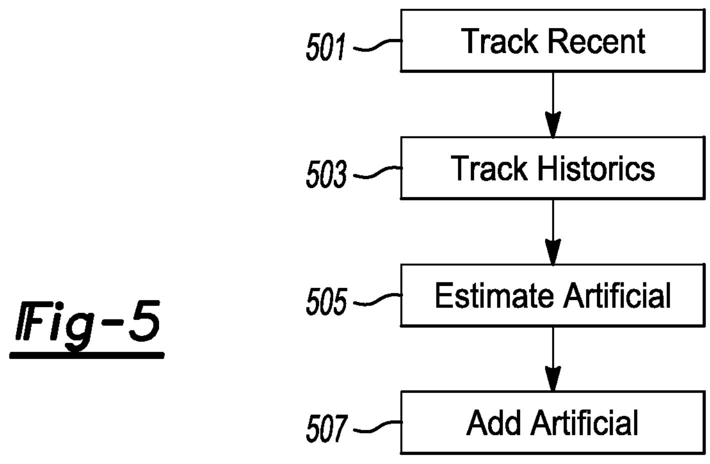
FIG. 5 shows an illustrative process for count modification.

FIG. 5 shows an illustrative process for count modification. This is one example of how historic data can be used to modify thresholds or, as in this example, dynamically modify a count of passengers. While not necessary, this non-limiting example demonstrates how an automated dispatch process can accommodate for expected arrival of people, and so more-efficiently dispatch vehicles in a manner that serves the passengers more quickly as need arises, while helps prevent keeping people from waiting.

In this example, the process tracks recent arrival of people at 501. This is historic data, but only in a very temporally proximate sense. The range can be set to, for example, 30 minutes, one hour, etc., and/or a variety of ranges can be used and tracked. This data may also be weighted more heavily, as it is indicative of presently observed conditions. This data may help identify outliers in larger historical data sets—e.g., when an area at a far edge of a parking lot that typically experiences one passenger per hour is suddenly experiencing a heavy influx, this may be because all other regions of the lot are full. Moreover, if a network of MEC cameras 100 is deployed throughout a parking area, the observed usage of parking can be used as an estimate as well. Even if the cameras do not have a view of every spot, assuming a roughly equal distribution of parking space utilization, a camera viewing 100 spots out of every 400 can estimate that the distribution of vehicles is probably the same over the 400 spaces. That means that if only one spot is free, then the likelihood of additional passengers arriving in that zone (all 400 spaces) is low, and other zones may experience greater influx. So even if recent historical data at, say, 5 AM, does not indicate that the fringe zone is experiencing significant arrival, the immediate data about the availability of parking elsewhere (near zero) may indicate a likely influx of passengers to the fringe zone at 6:30 AM, when other historic data indicates that people tend to arrive at an airport in larger numbers.

This and other historical data (such as typical per-minute arrivals at a zone) may be contemplated as well by both the MEC cameras and/or the dispatch process at 503, and may be weighted appropriately. Weighting need not only be a function of age of data, in the preceding example the historic data for the fringe zone may be weighted (or the count may be adjusted) in some inverse manner to the parking available elsewhere—e.g., if there are 1-5% of spots available elsewhere, the weight may be high, if there are 30%+ spots available elsewhere, the weight may be low. Other historic factors may also be contemplated, such as weather—e.g., if the fringe parking is covered and it is raining, higher weight may be given to historic data as people are more likely to park under covered parking. Once data sets of sufficient size are known, the data can be contextualized under present context and data sets can be culled down to the relevant data, which may be given a higher ranking due to correspondence to the present context—e.g., either prior scenario, observed sufficient times to increase confidence in data and data-set size, may simply result in using only the contextually relevant data.

Once the appropriate data determinations have been made, the process can estimate an artificial count at 505, which in this example is the number of people expected to arrive while the vehicle is in transit. This count can be added to the total number of people at 507, or at least used as a modifier. In one example, it is a multiplicative modifier to avoid a zero-real-people dispatch, and in other examples it may only trigger upon the presence of at least one actual person. At the same time, if accurate enough, it may serve to dispatch a vehicle even if zero real people are present, because it may be highly indicative of an incoming influx of passengers—e.g., at 6:20 there may be zero real people, but all the data may indicate that by 6:30 there will likely be 20 people.

While simply a non-limiting example, this is an instance where historical observed data may modify the count data or threshold data to continually dispatch vehicles in a highly efficient manner that decreases passenger wait times, accommodates both present volumes and special assistance needs, preserves vehicle life and resource utilization, prevents pointless (zero passenger) vehicle trips, and mitigates the need to have every fleet vehicle be as large and needs-accommodative as possible. Historical data is not the predicate for these improvements, it can simply further them, the systems and methods described herein achieve this even in the absence of historical data utilization.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:

a multi-access edge computing camera, including a processor configured to:

determine characteristics of a group of waiting vehicle passengers based on machine-classification and count of individual elements of the group derived from imaging the group with the camera;

supplement at least the count based on short-range wireless broadcast received from mobile devices possessed by members of the group;

convey the characteristics to a dispatch processor, the dispatch processor configured to:

determine that a non-dispatched fleet vehicle has present capacity to accommodate the determined characteristics;

determine that the characteristics meet a defined predicate for dispatch of the non-dispatched fleet vehicle; and responsive to determining that the characteristics meet a defined predicate for dispatch of the non-dispatched fleet vehicle, dispatch the fleet vehicle.

2. The system of claim 1, wherein the characteristics include identifying special assistance needs.

3. The system of claim 2, wherein the special assistance needs include the presence of wheelchairs.

4. The system of claim 2, wherein the special assistance needs include the presence of service animals.

5. The system of claim 2, wherein the special assistance needs include the presence of oversized luggage sized beyond a threshold.

6. The system of claim 2, wherein the defined predicate includes dispatching the fleet vehicle responsive to the presence of the identified special assistance need.

7. The system of claim 1, wherein the characteristics include a headcount.

8. The system of claim 7, wherein the defined predicate includes dispatching the fleet vehicle responsive to the headcount being above a dispatch threshold.

9. The system of claim 8, wherein the dispatch threshold is defined based on capacity of the lowest capacity non-dispatched fleet vehicle.

10. The system of claim 9, wherein at least one of the headcount or capacity is modified by a determination of additional passengers projected to arrive while a dispatched vehicle is in transit.

11. The system of claim 10, wherein the determination of additional passengers is based on historical data.

12. The system of claim 11, wherein the historical data is weighted based at least in part based on recency, weighting more recent data higher than less recent data.

13. The system of claim 11, wherein the historical data is chosen based on a correlation to present context.

14. The system of claim 13, wherein the present context includes at least one of temporal or environmental-event context.

15. The system of claim 10, wherein the determination of additional passengers is based on data from other multi-access edge computing cameras indicating usage of parking within the view of the other cameras.

16. The system of claim 1, wherein the characteristics include a luggage count.

17. A method comprising:

determining a count of vehicle passengers in a defined loading zone using a multi-access edge computing camera, based at least in part on both counting detected short-range wireless transmissions from passenger devices and machine analysis of imaging of the loading zone capture by the camera;

determining an available fleet vehicle having present capacity to service the count of vehicle passengers; and dispatching the fleet vehicle to the loading zone responsive to determining that the available vehicle has present capacity.

18. The method of claim 17, wherein the determining the count includes determining at least one special assistance need of the vehicle passengers based at least in part on at least one of machine analysis or information included in the short-range wireless transmission; and wherein the determining the available fleet vehicle includes determining that the available vehicle includes capability to accommodate the special assistance need.

19. A non-transitory computer readable storage medium storing instructions that, when executed, cause one or more system processors to perform a method comprising:

determining a count of vehicle passengers in a defined loading zone using a multi-access edge computing camera, based at least in part on both counting detected short-range wireless transmissions from passenger devices and machine analysis of imaging of the loading zone capture by the camera;

determining an available fleet vehicle having present capacity to service the count of vehicle passengers; and dispatching the fleet vehicle to the loading zone responsive to determining that the available vehicle has present capacity.

20. The storage medium of claim 19, wherein the determining the count includes determining at least one special assistance need of the vehicle passengers based at least in part on at least one of machine analysis or information included in the short-range wireless transmission; and wherein the determining the available fleet vehicle includes determining that the available vehicle includes capability to accommodate the special assistance need.

* * * * *